(12) United States Patent
Kovalan et al.

(10) Patent No.: US 6,453,374 B1
(45) Date of Patent: Sep. 17, 2002

(54) DATA BUS

(75) Inventors: Mark A. Kovalan, Cedar Rapids; Bryon L. Wiscons, Marion; John L. Persick, Robins; Douglas R. Johnson, Cedar Rapids; Gregory E. Dunn, Marion; Stephen I. Kotalik, RR Midway, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/281,584

(22) Filed: Mar. 30, 1999

(51) Int. Cl.[7] .............................................. G06F 13/00

(52) U.S. Cl. .......................................... 710/100; 326/30

(58) Field of Search ............................ 710/29, 60, 100, 710/101, 107; 326/21, 30, 86

(56) References Cited

U.S. PATENT DOCUMENTS

| | | | | |
|---|---|---|---|---|
| 3,657,478 A | * | 4/1972 | Andrews, Jr. ............. | 178/63 E |
| 4,280,221 A | * | 7/1981 | Chun et al. ................ | 375/257 |
| 4,484,263 A | * | 11/1984 | Olson et al. ............... | 710/66 |
| 4,589,111 A | * | 5/1986 | Adachi ....................... | 714/748 |
| 4,809,297 A | * | 2/1989 | Polansky et al. .......... | 375/220 |
| 5,091,847 A | * | 2/1992 | Herbermann ............... | 714/3 |
| 5,119,482 A | * | 6/1992 | Lloyd ......................... | 710/307 |
| 5,129,063 A | * | 7/1992 | Sainola et al. ............. | 710/1 |
| 5,467,455 A | * | 11/1995 | Gay et al. .................. | 710/101 |
| 5,469,502 A | * | 11/1995 | Matsumoto ................ | 379/230 |
| 5,555,266 A | * | 9/1996 | Buchholz et al. .......... | 370/347 |
| 5,787,120 A | * | 7/1998 | Louagie et al. ............ | 375/257 |
| 6,026,456 A | * | 2/2000 | Ilkbahar ..................... | 710/101 |
| 6,049,525 A | * | 4/2000 | Takahashi et al. ......... | 370/223 |

* cited by examiner

Primary Examiner—Xuan M. Thai
(74) Attorney, Agent, or Firm—Nathan O. Jensen; Kyle Eppele

(57) ABSTRACT

A bus system including a bus user apparatus and a method for communicating via the bus system are disclosed. The bus user apparatus includes means for means for selectively coupling a transmitter to the transmission line according to a protocol of the bus system. The bus system provides bi-directional communication over a single transmission line. The transmitter of the transmitting device is coupled to the transmission line during transmission. Upon completion of transmission, the transmitting device sends a permission to transmit signal to the next transmitting device according to the protocol, and decouples its transmitter from the transmission line. The next transmitting device couples its transmitter to the transmission line and begins transmission of data. Multiple bus users, both transmitters and receivers, are accommodated by the bus system, and bi-directional communication is supported. Further, the data transmission rate may be increased by selectively coupling the transmitter of a receiving device to the transmission line to provide a termination impedance on the transmission line. Higher transmission rates may be accommodated without a termination impedance; if necessary, a termination impedance may be applied. If necessary, the output voltage of the transmitter and the sensitivity of the receiver may be adjusted to accommodate the higher transmission rates. The bus system may also accommodate larger sized words. The bus system is compatible with previously existing systems compliant with an ARINC standard while providing increased capability.

9 Claims, 4 Drawing Sheets

DATA BUS

FIELD OF THE INVENTION

The present invention generally relates to the field of data buses, and particularly to a data bus for utilization in an avionics environment.

BACKGROUND OF THE INVENTION

In an avionics environment, data transmission techniques among electronic and computer devices on air transport aircraft typically conform to standards promulgated by Aeronautical Radio, Inc. (ARINC) of Annapolis, Md., such as ARINC 429 or 629. ARINC 429 specifies for unidirectional data flow only, from one transmitting device to one or more receivers. Therefore, a minimum of two buses (one in each direction) is required for two electronic devices to send data to one another, and more may be needed if the data rate cannot be accommodated by the maximum 100 kHz bit rate available on a bus. Adding physical connections (i.e. wires and cabling) negatively affects aircraft cost and weight. However, ARINC 429 is a prolific standard since it is inherently simple in nature, an advantage when safety-analyzing critical avionics systems, and terminal devices are readily available and inexpensive. Although ARINC 629provides a multi-master protocol at 2 MHz bit rates, terminal devices are more complex and much more expensive. Other busing mechanisms being introduced into aircraft have higher complexity, and are not backward compatible to the existing standards (e.g., ARINC 429).

The need for additional avionics bussing capability is also brought about by industry trends toward functional integration, particularly when it is desired to upgrade existing equipment by incorporation of additional functions. While technological advances in processing, memory, etc. may allow much greater functionality to be incorporated into a computer, the existing unit may have limitations in input and output pins as defined by existing aircraft wiring and connector selection, particularly if it is desired to allow the computer to back-fit into an existing aircraft, e.g. for spares commonality. Hence, it is desirable to make the greatest use possible of preexisting pin counts, and one method of doing so is to provide for two-way data transmission on an existing pair of pins previously used only for one-way data transfer.

Thus, there lies a need for a lower cost, relatively non-complex data bus, well-suited to aircraft environmental and certification requirements, with bi-directional or multi-master capability. It would be additionally advantageous for such a bus to be compatible with an existing ARINC standard to the greatest degree possible in order to allow existing test equipment and potentially other existing aircraft equipment to monitor such a bus. This advantage may be increased by providing additional capabilities such as providing increased bit rates over present ARINC standards. Furthermore, the desire to maximize commonality in designs suggests a need for a data bus used to interconnect units in an aircraft to also be useful and efficient for interconnecting modules or assemblies within a unit.

SUMMARY OF THE INVENTION

The present invention addresses the need for a simple, low cost, multiple data source databus suitable for an aircraft vehicle or the like for reduced aircraft wiring costs and avionics computer pinout. In addition, it addresses higher speed data bus operation. Combinations of these ideas allows trading off compatibility with existing bus standards and components versus higher bit rates, with the potential of simultaneously accommodating both on a limited basis. Upgrades or retrofits of existing aircraft may particularly benefit from this approach.

Two bus unit improvements are described: multi-source (bi-directional) data transfer capability and higher data rate transfers. A combination of these improvements is also described. Two approaches to multi-source data transfer are described, and two approaches to higher speed operation, along with operation in conjunction with multi-sourcing and intermixture with conventional bit rates.

Therefore, the present invention is directed to an electronic device for communicating via a bus system. In one embodiment, the electronic device includes means for sending and receiving data via a transmission line of the bus system, a transmitter for receiving data from the sending and receiving means and providing the data to the transmission line, a receiver for receiving data from the transmission line and providing the received data to the sending and receiving means, and means for selectively coupling the transmitter to the transmission line according to a protocol of the bus system.

The present invention is further directed to a method for communicating via a bus system. In one embodiment, the method includes steps for coupling a first device to a transmission line whereby the first device may transmit via the transmission line, transmitting data from the first device via the transmission line, upon completion of said transmitting step, transmitting a permission to transmit signal to a second device coupled to the transmission line, decoupling the first device from the transmission line and coupling the second device to the transmission line whereby the second device may transmit via the transmission line, and transmitting data from the second device via the transmission line. In another embodiment, the method includes steps for transmitting data via a transmission line at a first rate by transmitting data from a transmitting device to a receiving device, determining whether to transmit data via the transmission line at a second rate, in the event it is determined to transmit data at a second rate, coupling an impedance to the transmission line whereby a second transmission rate is accommodated, and transmitting data via the transmission line at a the second rate. In an additional embodiment, the method further include steps for, prior to executing the coupling step, determining whether to terminate the transmission line with an appropriate impedance, and, in the event it is determined to terminate the transmission line with an appropriate impedance, executing the coupling step.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
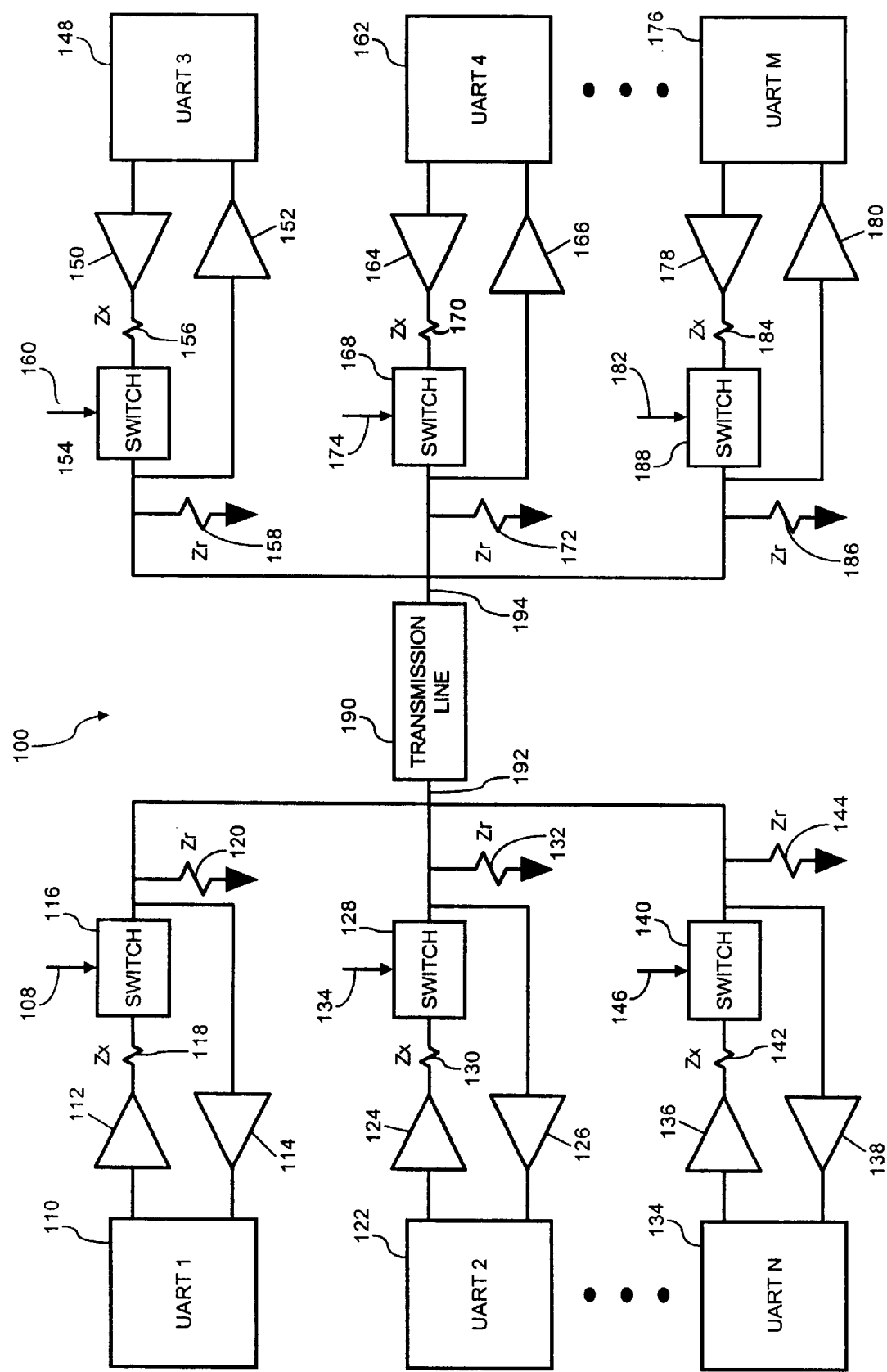
FIG. 1 is a schematic diagram of a multiple user, bi-directional bus system in accordance with the present invention.

Referring now to FIG. 1, a bus system supporting bi-directional communications among multiple bus users in accordance with the present invention will be discussed. Bus system 100 allows for a universal asynchronous receive and transmit device (UART) 110 to couple to transmission line 190. UART 110 may be operably disposed within an electronic device such as a computer that utilizes bus system 100 to communicate with other devices also coupled with bus system 100. UART 110 provides serial transmit data and accepts received serial data from bus system 100. UART 110 provides transmission signals to transmitter 112 for transmitting information via transmission line 190, and receiver 114 receives information transmitted to UART 110 via transmission line 190. UART 110 presents serial transmit data to transmitter 112 which provides appropriate drive characteristics for sending signals over transmission line 190. Similarly, receiver 114 extracts data from transmission line 190 and provides the data to UART 110. The series output impedance of transmitter 112 is represented by transmitter impedance Zx 118, and the parallel input impedance of receiver 114 is represented by receiver impedance Zr 120. A switch 116 is utilized to couple or decouple transmitter 112 to or from transmission line 190. Switch 116 selectively connects transmitter 112 (and associated transmitter impedance Zx 118) to transmission line under direction from bus protocol logic received from control input 108 which controls the switching action of switch 116. Switch 116 may be embodied as an analog switching device (e.g., a transistor), preferably with a relatively low on resistance, or may be integrated directly within transmitter 112 such that transmitter 112 may be decoupled from transmission line 190.

As shown in FIG. 1, the invention provides the coupling of one or more UART devices 110, 122 and 134, up to N number of transmitting UARTs, to transmission line 190, and provides the coupling of UARTs 148, 162 and 176, up to M number of receiving UARTs, to transmission line 190. Each of the UARTs shown in FIG. 1 further include likewise transmitters, receivers and switches, including representative transmitter and receiver impedances as shown. As discussed herein, transmitting UARTs 110, 122 and 134 may in turn become receiving devices, and receiving UARTs 148, 162 and 176 may in turn become transmitting devices. As defined herein, any device connected to transmission line 190 capable of both transmitting and receiving data via transmission line 190 is referred to as a bus user.

Bus system 100 as shown in FIG. 1 allows multiple data sources (e.g., UARTs 110, 122, 134, 148, 162 and 176) to embody a data bus in compliance with an ARINC standard. Bus system 100 may be considered bi-directional since two or more devices intercommunicate among the other devices. Each transmitter 112, 124, 136, 150, 164 and 178 is provided with a switch 116, 128, 140, 154, 168 and 188, respectively, to allow connection of the respective transmitters to transmission line 190 when transmission is to occur, and to disconnect the respective transmitters to allow another bus user to transmit via transmission line 190. A transmission control protocol is utilized to allocate appropriate transmission times. In a preferred embodiment, a first bus user (e.g., UART 110) is designated as a controller that transmits a message to a second bus user (e.g., UART 122) granting the second bus user permission to transmit in the event UART 122 is to transmit information via transmission line 190. While UART 110 is transmitting, switch 116 is closed so that transmitter 112 is coupled to transmission line 190, and switch 128 is open so that transmitter 124 is decoupled from transmission line 190. Upon transmitting a permission to transmit message to UART 122, UART 110 disconnects transmitter 112 from transmission line 190 by opening switch 116 while UART 122 closes switch 128 for coupling transmitter 124 to transmission line 190 to allow UART 122 to communicate via transmission line 190. The designated transmitting bus user (UART 122) sends the appropriate data over transmission line 190, and then transmits a final data transfer signal indicating to UART 110 (the designated bus controller) that its transmitted message is complete and transmission by another bus user may occur. UART 122 then disconnects transmitter 124 from transmission line 190. UART 110 may then in turn designate any of the other bus users (e.g., UARTs 134, 148, 162 and 176) to transmit via transmission line 190 as necessary. In an alternative embodiment, instead of designating a single bus user as a bus controller, a presently transmitting bus user is capable of designating another bus user as the next transmitter in a more distributed control transfer bus system 100. For either the designated controller or distributed control embodiments, a timeout mechanism may be provided to recognize the event that control was not properly passed to the subsequent bus user, for example in the event a bus user unintentionally becomes disconnected from bus system 100 (e.g., during transmission), and no subsequent bus user has been designated for a predetermined period of time. In response to the time out event, the next bus user in turn is automatically selected. The time out occurrence may be logged so that the disconnected bus user may be reconnected at a future time, or so that maintenance action may be indicated. The transmission protocol described herein may be implemented either as a hardware embodiment (e.g., logic circuits) or as a software embodiment (e.g., a program of instructions executed by a processor). The message designating a bus user to transmit may employ a unique label that indicates transfer of transmission control including data for selecting the desired bus user, or other means may be employed to positively identify the next bus user in sequence.

In a preferred embodiment of the present invention, bus system 100 may be utilized with a bus compliant with an ARINC 429 specification which provides a detailed description of signaling levels, anticipated output impedance levels, etc. The ARINC bus typically involves differential drive of a twisted pair of wires for unidirectional data communications. The multiple-source bus operation of bus system 100 allows conventional ARINC 429 bus interconnection means (cable type, number of taps, etc.) to continue to be used among presently existing avionics units and electronic devices. However, by utilizing bus system 100 of the present invention, the heretofore unidirectional data flow under an ARINC 429 standard is capable of providing time-shared data flow from any bus user selected in turn to all other bus users on bus system 100. Furthermore, some bus users connected to bus system 100 may be conventional, receive-only ARINC standard devices, accepting appropriate data from bus system 100 while still allowing bi-directional communications among multiple bus users. In addition, conventional ARINC 429 standard test equipment may be used to observe operation of bus system 100. Thus, bus system 100 provides maximum compatibility with existing ARINC 429 specifications.

A second embodiment of bus system 100 may be utilized where only two bus users will utilize transmission line 190 (e.g., UART 110 and UART 148). In such an embodiment, switches 116 and 154 would not be required such that, in effect, switches 116 and 154 are always closed. The same protocol previously described may be used to determine which bus user may transmit at any given time. However, in this embodiment, the bus user not presently designated to transmit presents a load impedance equal to it transmitter output impedance. For example, in the event UART 110 transmits to UART 148, transmitter impedance Zx 156 will be coupled to transmission line 190 since switch 154 is not present or effectively closed. Hence, the voltage level of the signal received by receiver 152 is one-half the unloaded transmitter voltage of transmitter 112 since due to the voltage divider effect resulting from the presence of transmitter impedance Zx 156. In a preferred embodiment of the present invention, receiver impedances Zr (120, 132, 144, 158, 172 and 186) are much larger valued than transmitter impedances (118, 130, 142, 156, 170 and 184), for example by at least an order of magnitude. In order to maintain existing ARINC 429 signaling levels, transmitter 112 may be modified to produce approximately twice the open-circuit voltage that would otherwise be used in a conventional ARINC 429 bus system so that conventional receive-only ARINC 429 devices may be connected to bus system 100. Alternatively, if compatibility of the bus voltage levels is not required for a given application, bus system 100 may be operated at essentially half voltage with receiver 152 altered to accept the reduced voltage levels. The reduced voltage level approach may be extended to more than two users by accounting for the voltage divider effect of transmitter output impedances Zx as a factor limiting the maximum number of allowable bus users.

The ARINC 429 specification defines transmission bit rates of up to 100 kHz. This data rate allows signal transition slew rates to be controlled (i.e. kept slow enough) in a manner consistent with relatively long interconnections and numerous taps, without undue degradation of signal fidelity, and without the need for receiving devices to provide termination impedances matched to the line. The maximum slew rate is essentially limited by the desire to have signal transition times be long compared to delay times through the connecting lines, thereby avoiding reflections. A transmitter source impedance is specified (e.g., transmitter impedance Zx 118), which provides a form of termination at the transmitting end (e.g., 192) of transmission line 190, but with ARINC standards bus system 100 would not operate in a terminated manner since taps and unterminated receivers are allowed. The ARINC 429 bus signaling mechanism utilizes a ternary, differential mode, called return to zero (RTZ) format. The RTZ format allows both clock and data to be readily recovered from the transmission stream at the expense of signal transitions. RTZ format is preferred for bus system 100, although alternatives are contemplated by the invention.

As the transmission bit rate increases, higher signal transition slew rates are required to ensure that signal levels reach the desired value before the bit rate requires transition back to another value. However, these higher slew rates will cause undesirable reflections and loss of signal fidelity unless the allowed interconnect line length and potential taps are reduced from that of the ARINC 429 specification to accommodate the higher slew rates. Alternatively, terminations can be used, where each end of a line is terminated in the characteristic impedance of the line, and any taps are preferably electrically short.

Increased bus rates between on bus system 100, such as greater than rates specified by an ARINC standard, may be achieved by providing faster slew rates (data transition times) and restrictions on line lengths and taps from a bus user to transmission line 190. For relatively short interconnections between avionics computers, e.g., within an equipment bay, and for communication between modules within a computer, where the very short distances can allow much higher rates, transmitting and receiving devices are modified to accommodate desired data rates and slew rates. Conventional ARINC 429 signal levels may be utilized, and transmission line 190 may be designed in accordance with ARINC specifications (e.g., characteristic impedance, etc.). Thus, the data rate may be increased beyond ARINC standards by ensuring that the line lengths between a bus user and transmission line are short enough such that signal propagation delay times are shorter than the slew rates resulting from the impedances of the configuration of bus system 100.

In one embodiment of the present invention, bus speeds considerably greater than those specified by an ARINC standard may be achieved by providing higher signal transition slew rates. Higher transition slew rates may be achieved by terminating ends 192 and 194 of transmission line 190 with an appropriate impedance (e.g., transmitter impedance Zx 118). In a preferred embodiment, each end 192 and 194 of transmission line 190 is terminated with an impedance equal (or as close as possible) to the characteristic impedance of transmission line 190. In an alternative embodiment, transmission line 190 is terminated with an impedance at one end 192 or the other 194. In either embodiment, any taps off of transmission line 190 are preferably kept short enough to avoid reduction in signal fidelity due to signal reflections, i.e. short enough that the time for a signal to propagate through the tap is short compared with the signal transition times. Thus, UART devices 110, 122 and 134 at a first end 192 of transmission line 190 are preferably in close proximity, and, likewise, UART devices 148, 162 and 176 at a second end 194 of transmission line 190 are preferably in close proximity. Matched termination with an appropriate impedance at a transmitting end only (e.g., terminated at end 192 with transmitter impedance Zx 118) is capable of providing acceptable signal fidelity at a receiving end (e.g., end 194) of transmission line 190 provided that resulting signal reflections are absorbed in a sufficiently closely matched transmitter impedance (e.g., transmitter impedance Zx 156) to avoid re-reflection, and further provided that poor signal fidelity at the matching end (e.g., end 194) is acceptable. Termination at the receiving end (e.g., end 194) only may also be used by utilizing a lower transmitter impedance Zx 118 at end 192. Either of these embodiments provides the advantage of maintaining signal voltage levels equal to the unloaded signal levels of transmitter 112, preferably at levels prescribed by an ARINC standard. In a preferred embodiment, transmission rates over transmission line may be increased greater than rates provided by an ARINC standard (e.g., greater than 100 kHz) without applying a termination impedance to transmission line 190, for example at 200 kHz. With known characteristics of transmission line 190 (e.g., length, characteristic impedance) and desired signal transition rates, an upper limit of transmission rates may be specified before a termination of transmission line is required. Thus, transmission rates may be increased an intermediate rate, a level greater than an ARINC standard but less than a rate at which line termination is required. In the event it is desired to transmit at a higher rate at which line termination is required, an appropriate impedance may be applied to transmission line 190.

For the more general embodiment in which terminations at each end of transmission line 190 are provided, the transmitter impedance Zx 118 may considered as a series resistance, and the resulting signal voltage level appearing on transmission line 190 is half that of the unloaded output voltage of transmitter 112. Hence, compared with conventional ARINC 429, receivers 114 and 152 may be provided with twice as sensitive threshold values, or alternatively transmitters 112 and 150 may be provided having twice the standard unloaded output voltage. In a further alternative embodiment, a combination of modifying the output voltages of transmitters 112 and 150, and modifying the threshold of receivers 114 and 152 may be utilized.

In one embodiment of the present invention, increased data rate techniques are combined with the multiple bus user protocol discussed herein. In the embodiment in which there are only two bus users (e.g., UARTs 110 and 148), switches 116 and 154 may be eliminated (or essentially be always closed) thereby allowing transmitter impedance Zx 156 (while not currently transmitting) to act as a receiver termination at end 194 of transmission line 190 for transmitter 112. In an alternative embodiment, additional bus users (e.g., UARTs 122 and 162) are allowed so long as they are located close to each end 192 and 194 of transmission line 190, e.g., connected with shorter length stubs.

In a further alternative embodiment of the present invention, conventional ARINC 429 transmission rates are utilized on bus system 100 along with the higher transmission rates as describes above. Such a configuration may be advantageous, for example, where additional capabilities are being added to presently existing equipment types, but a backward compatibility is required with other existing devices or test equipment. Such an intermixture of conventional ARINC 429 and higher rate data transmission is achieved by sending the conventional ARINC 429 data according to the normal timing and signal level specifications, and sending the higher rate data at a reduced signaling voltage that will not be detected by the conventional receiver thresholds. This reduction in signaling voltage can be achieved through a lower output voltage (open circuit voltage) from transmitters 112, 124, 136, 150, 164 and 178 and/or by changing the termination resistances (e.g., transmitter impedances Zx 118, 130, 142, 156, 170 and 184). For example, before transitioning to a higher bus rate, a bus user associated with transmitter 112 signals a bus user associated with receiver 152 to apply a lower resistance termination to the bus (e.g., transmitter impedance Zx 156), thereby reducing received voltage level and improving signal fidelity, and then signal removal of this resistance (e.g., transmitter impedance Zx 156) prior to transitioning back to conventional 429 rates. Thus, transmitter impedance Zx 156 at a receiving end 194 of transmission line 190 may be selectively coupled to receiving end 194 of transmission line 190 via actuation of switch 154 via control input 160 in accordance with the desired transmission rate to provide a selective termination impedance at receiving end 194 of transmission line 190.

Figure 2:
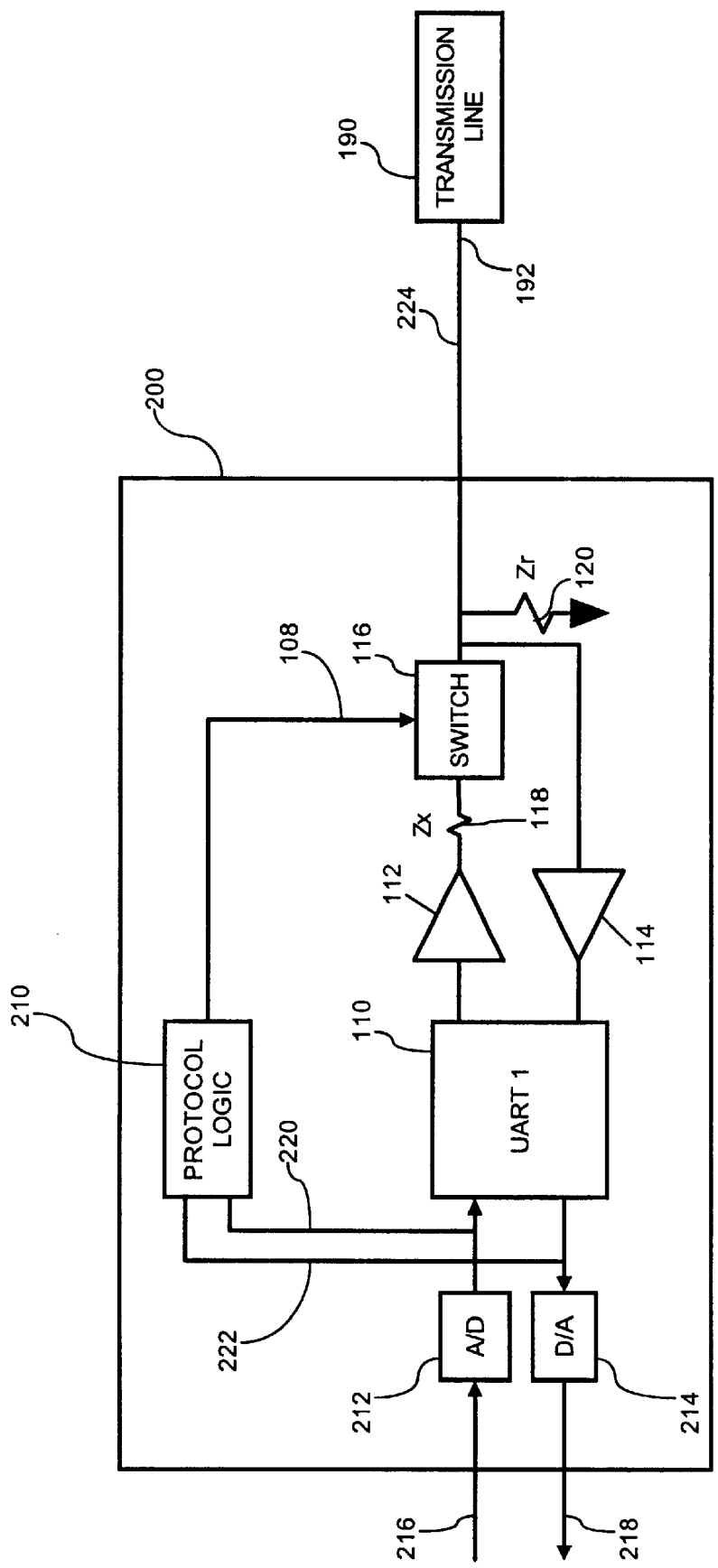
FIG. 2 is a block diagram of a user device of the bus system shown in FIG. 1.

Referring now to FIG. 2, an electronic device adapted for utilization with the bus system of the present invention will be discussed. Electronic device 200 is adapted to couple with transmission line 190 with an appropriate length connector 224 at end 192. Data to be transmitted via transmission line 190 is provided to electronic device 200 via input 216, and data transmitted via transmission line 190 to device 200 is provided via output 218. Information to be transmitted is received via input 216 and converted into a digital form with analog-to-digital converter (A/D) 212. The output of A/D 212 is provided to UART 110 wherein the output is also provided to a protocol logic controller 210. Protocol logic controller 210 may be implemented as hardware (e.g., logic circuits on an integrated circuit) or as software (e.g., implemented as a program of instructions executed by a processor, controller, computer, etc.), or as a combination thereof. Data received by UART 110 is provided to the input of digital to analog converter (DIA) 214. The input of D/A 214 is also provided to protocol logic controller 210. Protocol logic controller monitors signals provided by and to UART 110 in order to selectively control the operation of switch 116 via control input 108 in accordance with the utilized protocol. Thus, when UART 110 receives data to be transmitted, protocol logic controller may close switch 116 such that transmitter 112 (and associated transmitter impedance Zx 118) may be coupled to transmission line 190. Likewise, when UART receives data transmitted via transmission line 190, protocol logic controller 210 may open switch 116, thereby decoupling transmitter 112 (and associated transmitter impedance Zx 118) from transmission line 190. Further, in accordance with the present invention, protocol logic controller 210 may selectively couple or decouple transmitter 112 (and associated transmitter impedance Zx 118) from transmission line 190 to provide the desired line termination resistance (e.g., transmitter impedance Zx 118) to the end 192 of transmission line 190, for example in accordance with the desired transmission rate as discussed herein.

In an additional embodiment of the present invention, transmission of information having a word length greater than that specified by an ARINC standard may be implemented, for example, in a non-standard mode. For example, an ARINC standard may specify a 32-bit word comprising 8 label or header bits and 24 data bits. In this embodiment, a 40-bit word may be utilized comprising 16 label bits and 24 data bits. For example, in the case where transmission via bus system 100 occurs at a higher rate, the higher rate may allow for lager sized words, in which case a larger sized word may be utilized. Thus, a determination whether UART 110 may transmit larger sized words. In the event it is determined to transmit larger sized words, UART 110 could transmit larger sized words, for example to UART 148, via transmission line 190.

Figure 3:
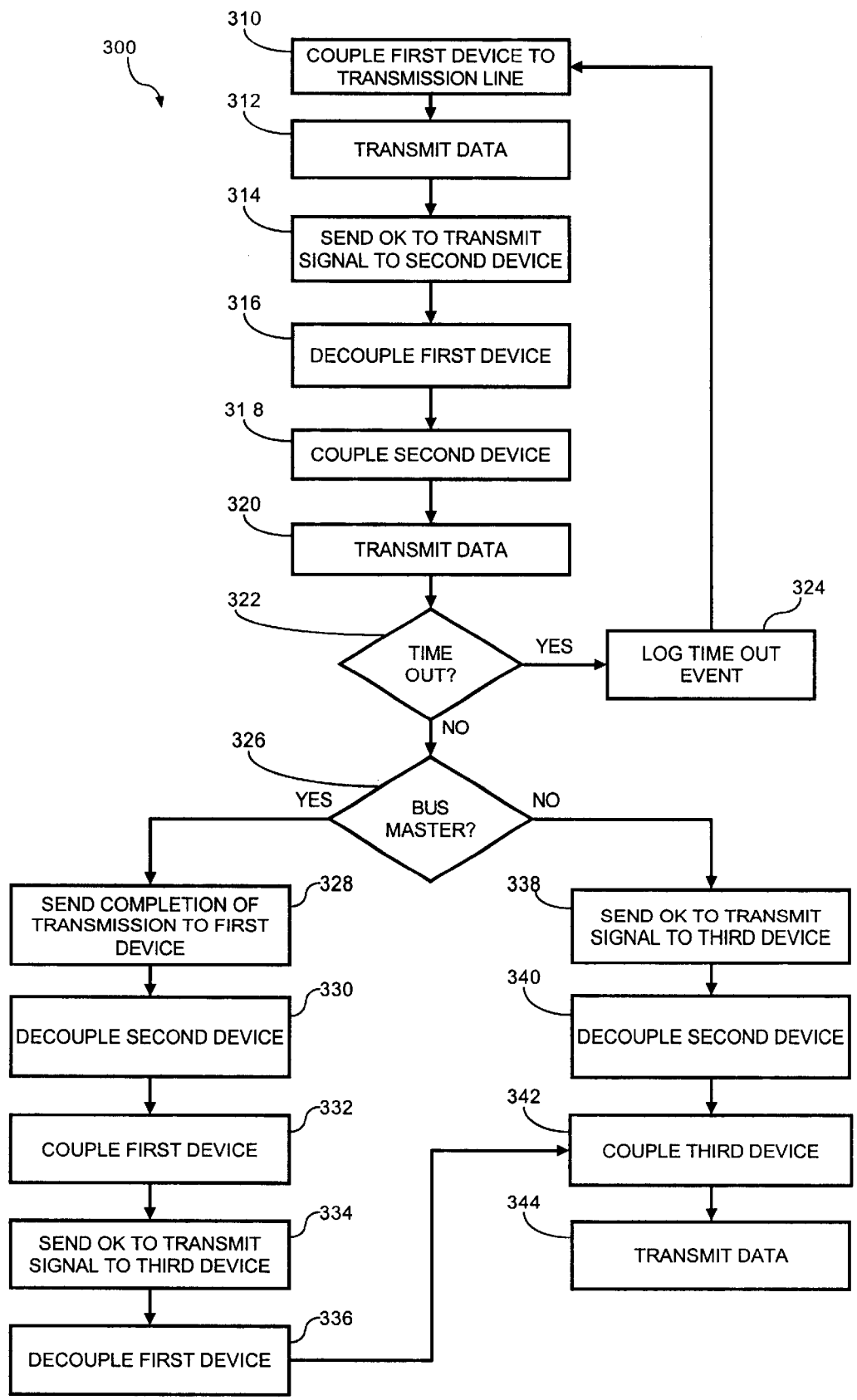
FIG. 3 is a flow diagram of a method for communicating via a bus system in accordance with the present invention.

Referring now to FIG. 3, a flow diagram of a method for communicating via a bus system in accordance with the present invention will be discussed. The method 300 may be implemented by protocol logic 210 on bus system 100. Method 300 begins at step 310 with the coupling of a first device (e.g., UART 110) to transmission line 190. The first device transmits data via transmission line 190 at step 312. Upon completing transmission step 312, the first device sends an OK to transmit signal to a second device (e.g., UART 122) at step 314. The first device is decoupled from transmission line 190 at step 316, and the second device is coupled to transmission line 190 at step 318. The second device transmits data at step 320 via transmission line 190. A determination is made at step 322 whether a time out event has occurred, for example, whether a predetermined period of time has been exceeded. In the event a time out event occurs, the time out event is logged at step 324, and another device such as the first device is coupled to transmission line 190 for continuing data transmission. In the event a time out event does not occur, a determination may be made at step 326 whether bus system 100 is operating under a bus master protocol or under a distributed control protocol. In the event it is determined that bus system 100 is operating under a distributed control protocol (i.e. not a bus master control protocol), the second device sends an OK to transmit signal to a third device (e.g., UART 176) upon the second device completing data transmitting step 320. The second device is decoupled from transmission line 190 at step 340, and the third device is coupled to transmission line 190 at step 342. The third device transmits data via transmission line 190 at step 344.

In the event it is determined that bus system 100 is operating under a bus master control protocol, a completion of transmission signal is sent at step 328 from the second device to the first device wherein the first device is functioning as a bus master controller. The second device decouples from transmission line 190 at step 330, and the first device recouples to transmission line 190 at step 332. The first device, acting as the bus master controller, sends an OK to transmit signal to a third device at step 334. The first device decouples from transmission line 190 at step 336, and the third device couples with transmission line 190 at step 342. The third device transmits data via transmission line 190 at step 344.

Figure 4:
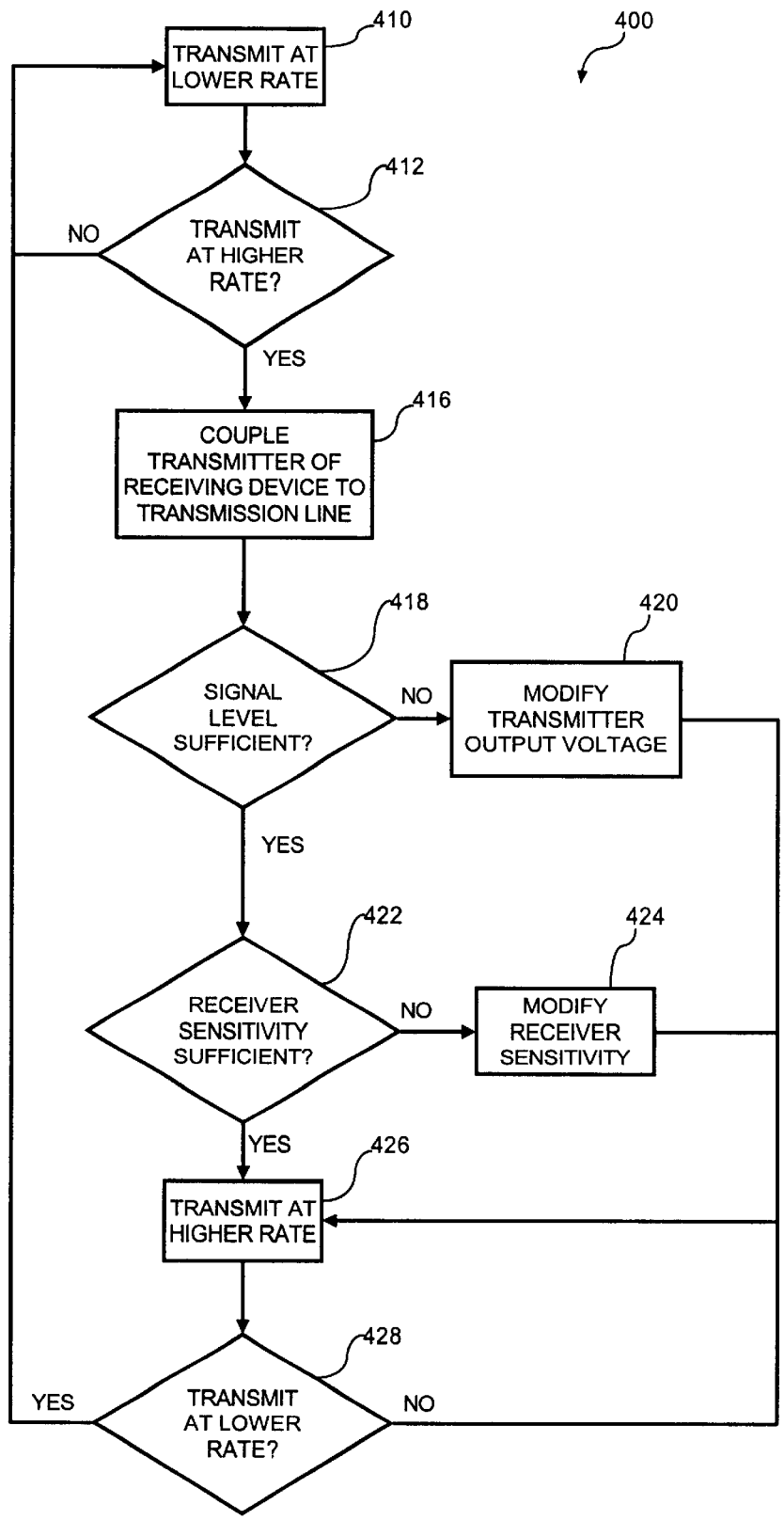
FIG. 4 is a flow diagram of a method for modifying the data transmission of a bus in accordance with the present invention.

Referring now to FIG. 4, a flow diagram of a method for modifying the data transmission of a bus in accordance with the present invention will be discussed. The method 400 may be implemented by protocol logic 210 on bus system 100. Method 400 initiates by transmitting data over buy system 100 at a lower rate, for example at a rate specified by ARINC standard 429. A determination is made at step 410 whether a device (e.g., UART 110) may transmit data at a higher rate. In the event it is determined to transmit data at a higher rate, the transmitter of a receiving device (e.g., transmitter 150 of UART 148) is coupled to transmission line 190 at step 416 to provide a line termination impedance that matches the characteristic impedance of transmission line 190 at least closer than without coupling the receiving transmitter. Ideally, the resulting termination impedance matches the characteristic impedance of transmission line 190 as closely as possible. A determination is made at step 418 whether the resulting signal level is sufficient such that a receiving device (e.g., UART 148) may properly detect the signal. In the event the signal is not sufficient, the transmitter output voltage (e.g., output voltage of transmitter 112) is modified at step 420, for example increased to a level such that the resulting voltage level with line termination is approximately equal to that without line termination.

A determination is made at step 422 whether the sensitivity of the receiving device (e.g., receiver 152) is sufficient to detect the signal with line termination on transmission line 190. In the event it is determined that the receiver sensitivity is not sufficient to detect the signal, the sensitivity of the receiver is modified at step 424, for example the sensitivity is increased such that receiver 152 may detect the signal level resulting from line termination of transmission line 190. The transmitting device (e.g., UART 110) transmits data at a higher rate at step 426. A determination is made at step 428 whether to communicated at a lower rate, and, in the event it is determined to transmit at a lower rate, (for example, when a receiving device can only receive data at a lower rate, the transmitting device reverts to transmitting at a lower rate at step 410. When reverting back to a lower transmission rate, all modifications implemented to allow higher rate transmissions (e.g., line termination, transmitter and receiver modifications, etc.) may be undone in order to accommodate lower rate data transmission and lower rate devices.

It is believed that the data bus of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for communicating via a bus system, comprising:
   transmitting data via a transmission line at a first rate by transmitting data from a transmitting device to a receiving device;
   determining whether to transmit data via the transmission line at a second rate;
   in the event it is determined to transmit data at a second rate, coupling an impedance to the transmission line whereby a second transmission rate is accommodated; and
   transmitting data via the transmission line at a the second rate.

2. A method as claimed in claim 1, the first rate being a lower rate and the second rate being a higher rate.

3. A method as claimed in claim 1, the first rate being a higher rate and the second rate being a lower rate.

4. A method as claimed in claim 1, further comprising the steps of determining whether the signal level resulting from said coupling step is sufficient, and, in the event it is determined that the signal level is not sufficient, modifying the output voltage of the transmitting device such that the signal level is sufficient.

5. A method as claimed in claim 1, further comprising the steps of determining whether the receiving device has a sufficient sensitivity upon execution of said coupling step, and, in the event it is determined that the sensitivity is not sufficient, modifying the sensitivity of the receiving device such that the sensitivity is sufficient.

6. A method as claimed in claim 1, said coupling step including the step of coupling a transmitter of the receiving device to the transmission line whereby the coupled impedance is provided by the transmitter of the receiving device.

7. A method as claim 1, further comprising the steps of, determining whether to transmit a larger sized word, and, in the event it is determined to transmit a larger sized word, transmitting a larger sized word.

8. A method as claimed in claim 1, the coupled impedance being approximately equal to a characteristic impedance of the transmission line.

9. A method as claimed in claim 1, further comprising the steps of, prior to executing said coupling step, determining whether to terminate the transmission line with an appropriate impedance, in the event it is determined to terminate the transmission line with an appropriate impedance, executing said coupling step.

\* \* \* \* \*